US010352010B2

(12) United States Patent
Khodr (10) Patent No.: US 10,352,010 B2
(45) Date of Patent: Jul. 16, 2019

(54) SELF-INSTALLING OFFSHORE PLATFORM

(71) Applicant: Saudi Arabian Oil Company, Dhahran (SA)

(72) Inventor: Rabih A. Khodr, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 15/431,058

(22) Filed: Feb. 13, 2017

(65) Prior Publication Data

US 2018/0230662 A1 Aug. 16, 2018

(51) Int. Cl.
*E02B 17/02* (2006.01)
*B63B 35/44* (2006.01)
*E02B 17/00* (2006.01)

(52) U.S. Cl.
CPC .............. *E02B 17/02* (2013.01); *B63B 35/44* (2013.01); *E02B 17/021* (2013.01); *E02B 2017/0039* (2013.01); *E02B 2017/0069* (2013.01); *E02B 2017/0082* (2013.01); *E02B 2017/0086* (2013.01); *Y02E 10/727* (2013.01)

(58) Field of Classification Search
CPC ............ E02B 17/02; E02B 17/021; E02B 2017/0065; E02B 2017/0039; E02B 2017/0043; E02B 17/00; B63B 35/4413; B63B 9/065; B63B 2009/067; E02D 23/02; E02D 27/425; E02D 27/52
USPC ......... 405/196, 200, 203, 205; 114/264, 266
See application file for complete search history.

(56) References Cited

U.S. PATENT DOCUMENTS

| | | | |
|---|---|---|---|
| 2,953,904 A * | 9/1960 | Christenson | .......... E02B 17/021 405/196 |
| 3,138,932 A | 6/1964 | Kofahl et al. | |
| 3,191,388 A | 6/1965 | Ludwig | |
| 3,277,653 A | 10/1966 | Foster | |
| 3,294,051 A * | 12/1966 | Khelstovsky | ....... B63B 35/4413 114/265 |

(Continued)

FOREIGN PATENT DOCUMENTS

DE 2457536 6/1976
JP 2016514779 A 5/2016

(Continued)

OTHER PUBLICATIONS

International Search Report and Written Opinion in International Application No. PCT/US2018/016854 dated Apr. 5, 2018, 16 pages.

*Primary Examiner* — Carib A Oquendo
(74) *Attorney, Agent, or Firm* — Fish & Richardson P.C.

(57) ABSTRACT

A self-installing offshore platform includes a top deck that supports an offshore facility, a column having a top end and a bottom end, the top end connected to the top deck, the column that supports the top deck to maintain the top deck above water in a water body in both the deployed state and the undeployed state of the self-installing offshore platform, a skirt connected to the bottom end of the column, the skirt residing above a floor of the water body in the undeployed state of the self-installing offshore platform and residing on the floor of the water body in the deployed state of the self-installing offshore platform, and a ballastable float positioned between the top deck and the skirt, the ballastable float floating in the water when the self-installing offshore platform transitions from the undeployed state to the deployed state.

13 Claims, 7 Drawing Sheets

(56) References Cited

U.S. PATENT DOCUMENTS

| | | |
|---|---|---|
| 3,389,562 A | 6/1968 | Mott et al. |
| 3,515,259 A | 6/1970 | Before |
| 3,535,884 A | 10/1970 | Chaney |
| 3,572,044 A | 3/1971 | Pogonowski |
| 3,575,005 A | 4/1971 | Sumner |
| 3,610,193 A | 10/1971 | Lacy et al. |
| 3,624,702 A | 11/1971 | Meheen |
| 3,797,256 A | 3/1974 | Giblon |
| 4,000,624 A | 1/1977 | Chow |
| 4,040,256 A | 8/1977 | Bosche et al. |
| 4,117,691 A | 10/1978 | Spray |
| 4,155,671 A | 5/1979 | Vos |
| 4,156,577 A | 5/1979 | McMakin |
| 4,161,376 A | 7/1979 | Armstrong |
| 4,227,831 A | 10/1980 | Evans |
| 4,271,412 A | 6/1981 | Glass et al. |
| 4,451,174 A * | 5/1984 | Wetmore ............ E02B 17/0021 405/196 |
| 4,534,678 A * | 8/1985 | Nakazato ................ E02B 17/02 405/204 |
| 4,666,341 A * | 5/1987 | Field ...................... B63B 35/10 114/40 |
| 4,711,601 A | 12/1987 | Grosman |
| 4,983,074 A | 1/1991 | Carruba |
| 5,188,484 A | 2/1993 | White |
| 6,612,781 B1 | 9/2003 | Jackson |
| 2002/0154954 A1* | 10/2002 | Huang .................... B63B 1/048 405/200 |
| 2005/0084336 A1 | 4/2005 | Xu et al. |
| 2006/0275080 A1 | 12/2006 | Li et al. |
| 2009/0191002 A1* | 7/2009 | Stubler ................ B63B 35/003 405/209 |
| 2010/0024705 A1* | 2/2010 | Leverette ............... B63B 35/44 114/264 |
| 2010/0150660 A1* | 6/2010 | Nadarajah ............... E02B 17/00 405/196 |
| 2011/0158750 A1 | 6/2011 | Reichel et al. |
| 2011/0305523 A1* | 12/2011 | Karal .................... E02B 17/025 405/207 |
| 2012/0216737 A1* | 8/2012 | Luo ....................... E02B 17/021 114/265 |
| 2013/0092069 A1* | 4/2013 | Xie ..................... B63B 35/4413 114/121 |
| 2013/0298815 A1* | 11/2013 | Bussemaker ........ E02B 17/021 114/121 |
| 2014/0308080 A1 | 10/2014 | Youman et al. |

FOREIGN PATENT DOCUMENTS

| | | |
|---|---|---|
| WO | 2010085970 | 8/2010 |
| WO | WO2015170098 A1 | 11/2015 |

* cited by examiner

SELF-INSTALLING OFFSHORE PLATFORM

TECHNICAL FIELD

This specification relates to offshore structures, for example, offshore structures to support hydrocarbon recovery equipment.

BACKGROUND

Hydrocarbons can be developed from onshore and offshore facilities. Offshore facilities can be supported by either floating platforms or fixed platforms. Fixed platforms are attached to the seafloor by either suction piles, a foundation, or the weight of the platform itself. These platforms may be installed at their required offshore location with the assistance of heavy-lift, floating crane vessels.

SUMMARY

This specification describes technologies relating to self-installing offshore platforms.

Certain aspects of the subject matter described here can be implemented as an off-shore platform. A self-installing offshore platform includes a top deck that supports an offshore facility during both a deployed state and an undeployed state of the self-installing offshore platform, a column having a top end and a bottom end, the top end connected to the top deck, the column that supports the top deck to maintain the top deck above water in a water body in both the deployed state and the undeployed state of the self-installing offshore platform, a skirt connected to the bottom end of the column, the skirt residing above a floor of the water body in the undeployed state of the self-installing offshore platform and residing on the floor of the water body in the deployed state of the self-installing offshore platform, and a ballastable float positioned between the top deck and the skirt, the ballastable float floating in the water when the self-installing offshore platform transitions from the undeployed state to the deployed state.

In the deployed state, the ballastable float is can be ballasted to sink in the water to the skirt. The ballastable float floats to a surface of the water when the self-installing offshore platform transitions from the deployed state to the undeployed state. The ballastable float can include an annular opening. The column is able to pass through the annular opening. The column can contain an annular moonpool configured to pass a vertical top-tensioned riser from the top deck to the floor of the water body. Rollers can connect the column and the ballastable float. The rollers can controllably move the column through the opening in the ballastable float. The rollers control a rate at which the column moves through the opening in the ballastable float. The rollers can also control a direction in which the column moves through the opening in the ballastable float. The offshore facility includes at least one of a hydrocarbon recovery facility, offshore wind turbine, navigational equipment or security-related equipment.

Certain aspects of the subject matter described here can be implemented as a method. In a vertically-oriented self-installing offshore platform that includes a top deck, a column connected to the top deck, a skirt connected to the column, and a ballastable float positioned between the top deck and the skirt, the self-installing offshore platform is deployed in a vertical orientation toward a floor of a water body from a surface of the water body, and in response to the self-installing offshore platform being deployed on the floor of the water body, the ballastable float is ballasted to sink towards the skirt.

Deploying the self-installing offshore platform includes lowering the top deck, the column and the skirt toward the floor of the water body. A rate at which the top deck, the column and the skirt are lowered toward the floor of the water body is controlled. The skirt contacts the floor of the water body when the self-installing offshore platform is deployed. The self-installing offshore platform is towed in the vertical orientation to a destination in the water body. The self-installing offshore platform is positioned in the vertical orientation before towing the self-installing offshore platform to the destination. The self-installing offshore platform is undeployed in a vertical orientation away from a floor of a water body towards a surface of the water body to an undeployed state. The ballastable float is de-ballasted to rise towards the top deck. Undeploying of the self-installing offshore platform includes raising the top deck, the column and the skirt toward the surface of the water body. A rate at which the top deck, the column and the skirt are raised away from the floor of the water body is controlled. The undeployed state includes the self-installing platform floating on the surface the body of water.

Certain aspects of the subject matter described here can be implemented as a method. In a vertically-oriented self-installing offshore platform that includes a top deck, a column connected to the top deck, a skirt connected to the column, and a ballastable float positioned between the top deck and the skirt, the top deck, column, and skirt are lowered in a vertical orientation toward a floor of a water body from a surface of the water body, and in response to the self-installing offshore platform being lowered on the floor of the water body, the ballastable float is ballasted to sink towards the skirt.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Certain fixed offshore structures utilize steel jacket substructures to support the topsides facilities. Certain other offshore installations utilize a substructure manufactured from reinforced concrete. Concrete, gravity-based structures rely on their own weight to resist any lateral environmental loads. The topsides structure is similar to that for steel-jacket structures, that is, it is either an integrated steel-deck configuration or is of modular construction with a module support frame. Gravity-based structures are often constructed with reinforced concrete and typically consist of a cellular base surrounding several unbraced columns that extend upward from the base to support the topsides superstructure above the water surface.

Typical offshore gravity-based structures are large in comparison to steel jacket structures. The large size and large environmental forces can cause design problems. The structural design requirements include the categories of material quality, strength, and serviceability. Most gravity-based structures are designed for several functions, namely combined drilling, production, and hydrocarbon storage. The design is targeted to minimize resistance to environmental loads while providing adequate support for the topsides structure. Typically, using a range of national and international engineering standards, materials, and specifications, the structure is designed to meet the criteria laid down for the ultimate progressive collapse, fatigue, and serviceability limit states.

This specification describes a self-installing gravity-based platform that employs a purpose-built installation aid which prevents ratcheting effects and helps control the lowering process during installation. The self-installing platform includes the following components: a top deck, a column, a float, rollers, and a skirt. The platform is capable of floating substantially on the surface of a water body, that is, the platform can have a draft of less than fifty feet, in a vertical position as it is towed from an onshore location to a preferred, offshore location for deployment in the water body. A "draft" is defined as the distance between the keel (bottom most part of the platform) and the surface of the water body. Once the desired location is reached, the platform is capable of deploying itself by transitioning from an undeployed state at the surface of a water body to a deployed state at the floor of the water body. The self-installing platform can be utilized for any number of applications including, but not limited to, hydrocarbon production, drilling, supporting a wind-turbine, supporting leisure facilities, combinations of them or other applications. The self-installing platform can be configured to utilize either dry or wet trees if the self-installing platform is utilized for hydrocarbon production.

By implementing the self-installing platform described here, offshore platforms can be built and installed more quickly and easily over current designs. The self-installing aspect of the self-installing platform allows deployment with smaller vessels and eliminates the risks associated with heavy lifts offshore. In some implementations, the self-installing platform can be re-usable, that is, once the self-installing platform is no longer needed, it can be moved to a new location. The re-usability and versatility of the self-installing platform further reduces life-cycle costs associated with a fleet of platforms. The self-installing platform has several advantages including quayside integration of topsides equipment, elimination of the need for a heavy lift vessel, elimination of the need for barge transport, reduction of time for offshore hook-up & commissioning, free floating stability, stability during installation sequence, acceptable vessel motion during applicable sea-states, and a stable foundation. All of the aforementioned advantages help reduce installation costs and safety risks.

Figure 1A:
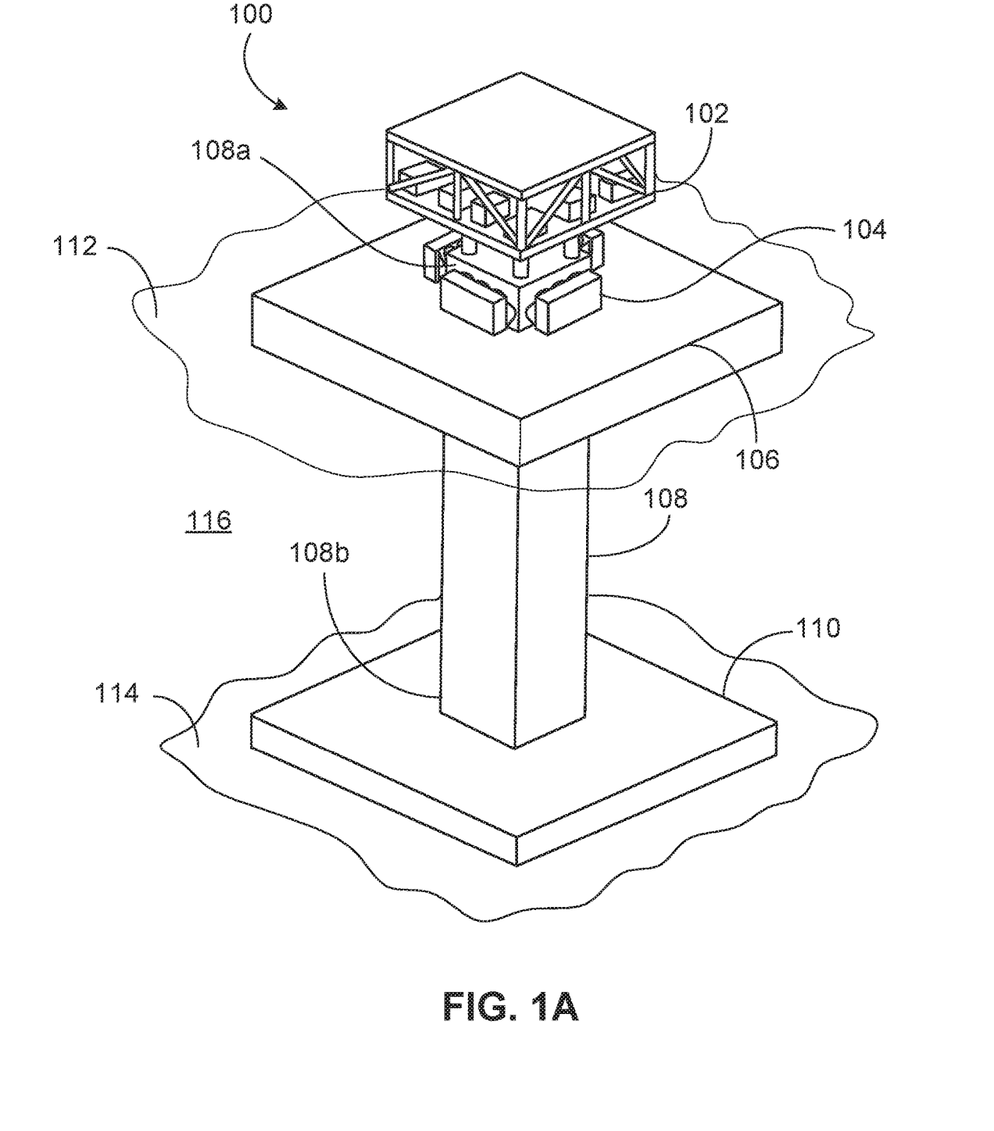
FIG. 1A shows an isometric view of an example self-installing platform.

FIG. 1 shows an example of a self-installing platform 100. The self-installing platform 100 includes a top deck 102, a float 106, rollers 104, a column 108, and a skirt 110. The column 108 has a top end 108a and a bottom end 108b. The top deck 102 is connected to the top end 108a of the column 108 while the skirt 110 is connected to the bottom end 108b of the column 108. The float 106 surrounds the column 108 and is connected to the column 108 through the rollers 104. The self-installing platform 100 can be placed in a water body 116 and can either float on the surface 112 of the body of water 116 or rest on the floor 114 of the water body 116, depending on the state of deployment of the self-installing platform 100.

Self-installing platform 100 can be constructed from formed concrete, reinforced concrete, steel, or any combination of common marine structure building materials. The column 108, skirt 110, and the top deck 102 can be constructed in a variety of shapes. For example, the skirt 110 could be constructed to be substantially circular or substantially square. Similarly, the column 108 could be cylindrical or rectangular. In dry-tree applications (hydrocarbon production), the skirt 110 can be U-shaped to allow a slipover-type installation around an existing conductor system. Also, the float 106 can have a variety of shapes, so long as the float 106 surrounds the column 108 and is able to connect to the column 108 through the rollers 104.

The top deck 102 can be utilized for a variety of applications, such as a hydrocarbon recovery facility, a drilling facility, an offshore wind turbine support, a leisure facility, navigational support equipment, security-related equipment, or any other offshore facility. In some implementations, facilities can be pre-installed on the top deck 102 before the self-installing platform 100 is deployed. The top deck can support 2-3 levels of facilities depending on the weight of the facilities.

The column 108 can be of sufficient length to keep the top deck 102 above the surface 112 of the water body 116 when the self-installing platform 100 is deployed. In some implementations, the column 108 can be constructed with isolatable internal compartments. The self-installing platform 100 can be deployed into a water body 116 up to 300 feet deep. The column is constructed of concrete, metal, or a combination of the two. In some implementations, the column 108 can be hollow to allow the self-installing platform 100 to have a moonpool. The moonpool can be utilized to run production risers or similar piping if the self-installing platform 100 is utilized as a production platform.

The skirt 110 can support the self-installing offshore platform 100 when the self-installing platform 100 is deployed. The skirt 110 can be thick enough and cover a large enough area for the self-installing platform 100 to survive an extreme storm event, such as a one hundred year storm. In some implementations, the skirt 110 can be constructed with isolatable internal compartments. Metocean data can be provided by government agencies or developed by companies to define what criteria are considered for such extreme storm events. In some examples, when the self-installing platform 100 is in an undeployed state, that is, the self-installing platform 100 is floating in a vertically-oriented position with a draft of, for example, 26 feet. The skirt 110 is designed to help maintain stability of the self-installing platform. The skirt 110 can be designed for both the deployed and undeployed states of the self-installing platform 100. In some implementations, such as the implementation illustrated in FIG. 1B, the float 106 can be outfitted with a temporary buoyancy module 118 during towing and installation. The temporary buoyancy module 118 can provide additional stability in some sea states.

Details on design considerations for the undeployed state of self-installing platform 100 are covered later in this specification.

The rollers 104 control motion through friction. The required amount of friction is obtained through a braking system controlled by an installation team during placement operations. The rollers have sufficient strength to support the entire weight of the self-installing platform 100 from the float 106, that is, when in an undeployed state, the rollers 104 prevent the top deck 102, the column 108, and the skirt 110 from sinking into the body of water 116. When deploying the self-installing platform 100, the rollers control the rate and direction of descent of the skirt 110, the column 108, and the top deck 102. In some implementations, a ballasting rate can be used to control the rate of decent. The rollers are able to control the rate of decent through friction obtained through an integrated braking system. In some implementations, the rollers 104 is removed after the self-installing platform has contacted the floor 114 of the water body 116. Removing the rollers 104 prevents them from deteriorating in the marine environment. In some implementations, the rollers 104 are capable of raising or recovering the self-installing platform 100 and are capable of lifting the top deck 102, the column 108, and the skirt 110 back to their undeployed positions. In such implementations, the rollers 104 include motors capable of lifting the platform components.

Figure 1B:
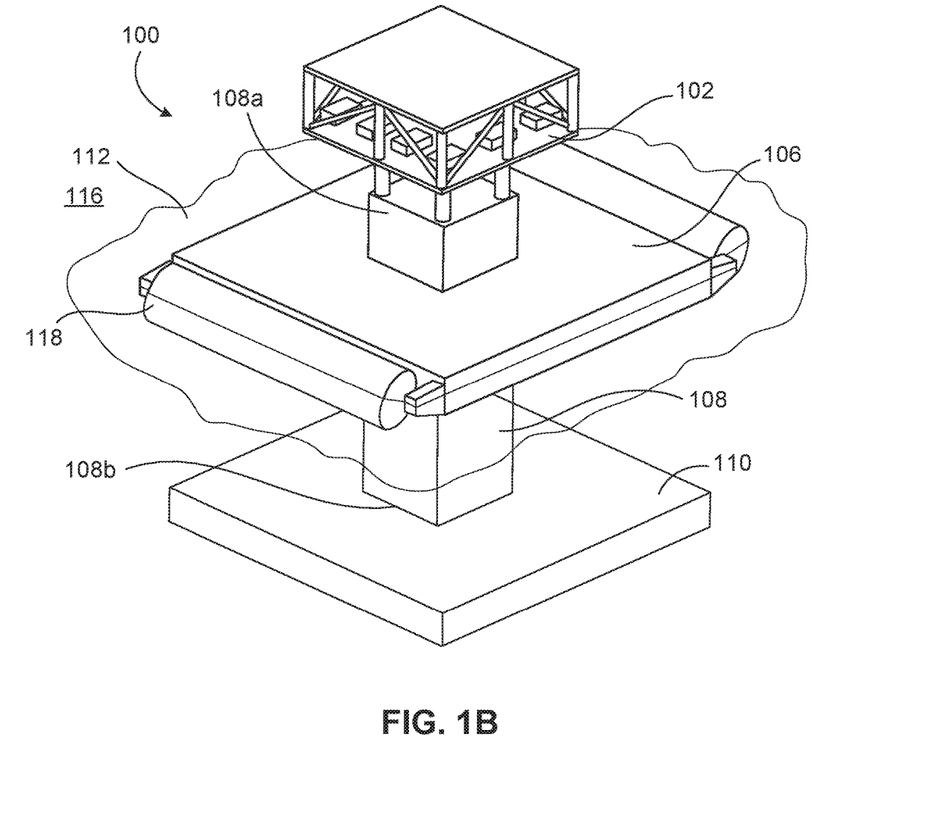
FIG. 1B shows an isometric view of an alternative example self-installing platform.

The float 106 surrounds the column 108 and is positioned between the skirt 110 and the top-deck 102. In other words, the float 106 includes an annular opening for the column to pass through. The float 106 is connected to the column 108 through the rollers 104. The float 106 is ballastable, that is, a buoyancy of the float 106 can be changed on demand. The buoyancy can be changed, for example, by opening a valve and flooding the ballastable float 106. In some implementations, the column 108 is ballastable as well. When the self-installing platform 100 is in the undeployed state, the float 106 is positioned along the column 108 atop the skirt 110. In the undeployed state, the float 106, column 108, and skirt 110 have a combined net buoyancy force sufficient to support the weight of the entire self-installing platform 100 on the surface 112 of the water body 116. When the self-installing platform 100 is transitioned from the undeployed state to the deployed state, the float 106 is ballasted to sink towards the floor 114 of the water body 116. When the self-installing platform 100 is in the deployed state, the float 106 is also positioned along the column 108 adjacent to the skirt 110, for example, to rest on top of the skirt 110. In some implementations, a damping plate can be added to the float 106 to reduce wave-induced motions and allow installation in more severe sea-states. In some implementations, the float 106 can be outfitted with a temporary buoyancy module 118 for additional stability. Details of the transition between the deployed and undeployed states of the self-installing platform 100 are described later in this specification.

Figure 2:
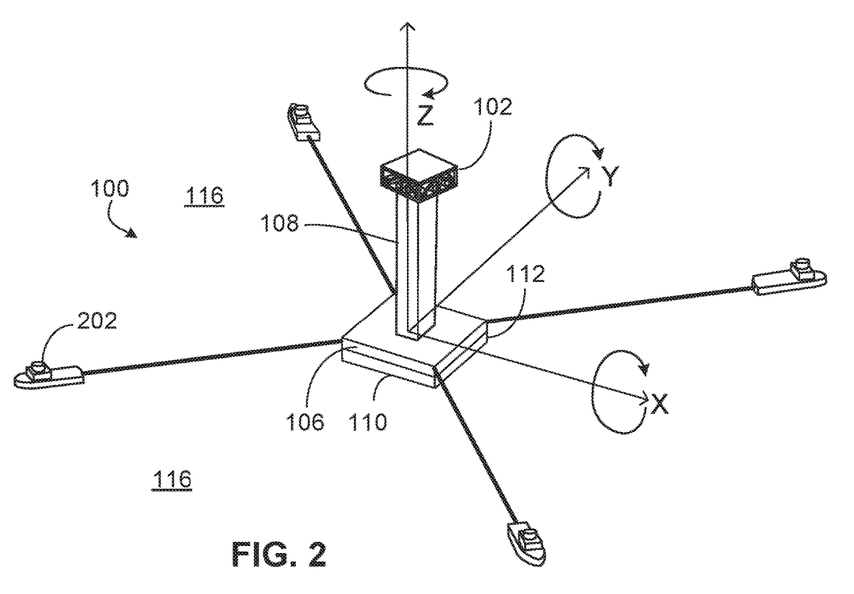
FIG. 2 shows an isometric view of an example self-installing platform floating and being towed.

FIG. 2 shows an example of an undeployed self-installing platform 100. In the undeployed state, the float 106 is connected to the column 108 adjacent to the skirt 106 and provides sufficient additional buoyancy to allow the undeployed self-installing platform 100 to float substantially on the surface 112 of the body of water 116. In some implementations, the undeployed self-installing platform 100 can have a draft of 22 feet. In some implementations, the undeployed self-installing platform 100 can be towed to a desired location by a ship 202 with capacity sufficient to tow the self-installing platform 100, such as a tug boat.

For the undeployed self-installing platform 100 to be stable during towing, certain criteria should be met. Different regions have different criteria that the undeployed self-installing platform 100 must meet. The requirements deal with the stability of the undeployed self-installing platform 100 in various sea-states, for example, a one year storm. Different regions have different met-ocean characteristics, for example, a 30 year storm in the Gulf of Mexico is different from a 30 year storm in the Arabian Gulf. The undeployed self-installing platform 100 must be able to handle whatever conditions coastal regulators have stipulated for each individual region; for example, in the Arabian Gulf, the undeployed self-installing platform 100 may be designed to survive a 1 year storm during towing.

The various dimensions of the undeployed self-installing platform 100 play a significant role in towing stability. For example, a key factor in a floating platform's stability is called the metacentric height (GM), which is the distance between the platform's center of gravity (G) and its metacenter (M). The metacenter is the point of intersection of an imaginary line drawn from G through the equilibrium center of buoyancy of the floating system and a vertical line drawn through the new center of buoyancy when the platform is tilted. For a floating platform to stay stable, the center of buoyancy must stay above the center of gravity, that is, GM must be a positive number. The greater the GM, the more stable the platform is. If a vessel has a GM that is a negative number, that is, the center of gravity is above the center of buoyancy, then the vessel will likely invert (capsize or flip over). Regulators may have a minimum GM requirement for platform stability, for example, 3 ft. The undeployed self-installing platform 100 can have a GM greater than 5 feet. The undeployed self-installing platform 100 has a stability similar to permanently floating platforms, such as truss-spars. In order to produce such a stable GM, the weight of the skirt must be sufficiently higher than the column 108, the top deck 102, and any facilities positioned on the top deck 102, to move the center of gravity below the center of buoyancy. The requirement for increased weight conveniently tends to increase the lateral dimensions of the skirt 110 as well. The increased lateral dimensions of the skirt 110 aids in supporting the self-installing platform 100 once it is deployed.

Figure 3:
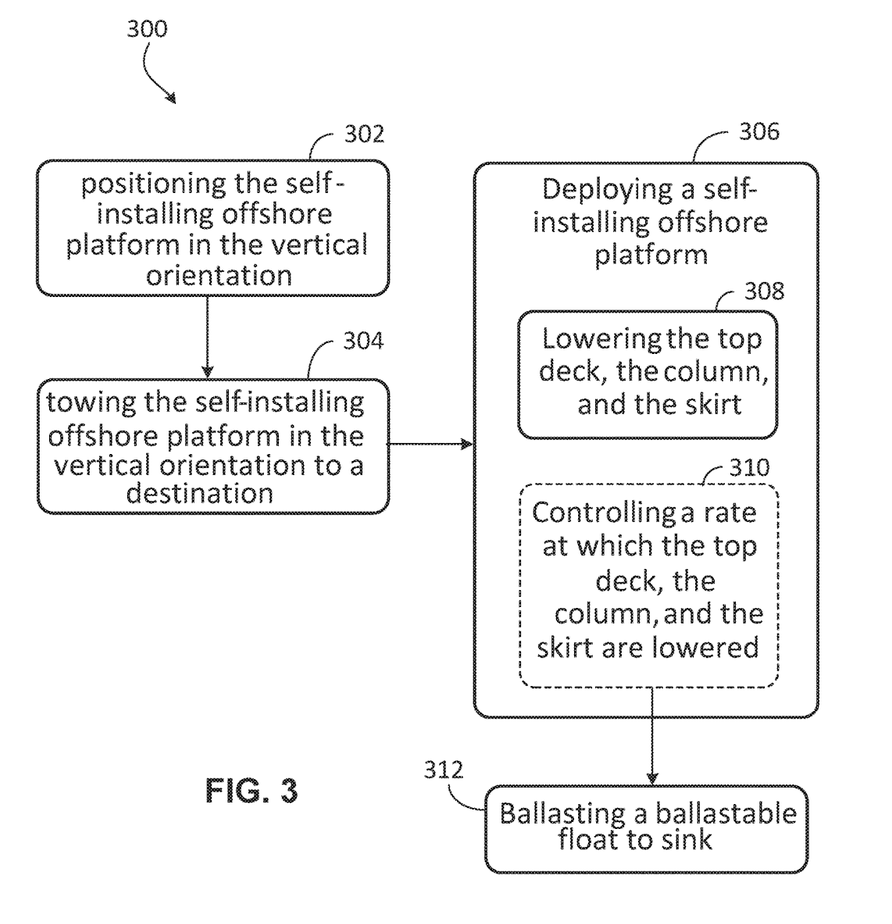
FIG. 3 shows a flowchart of an example method to deploy a self-installing platform.
Figure 4A:
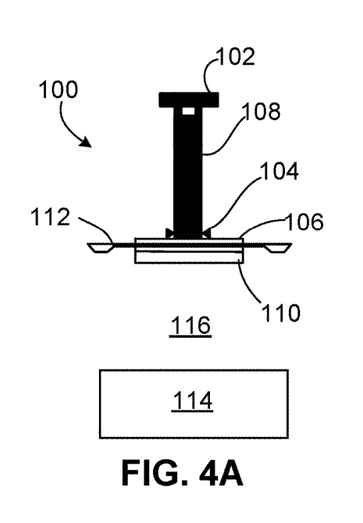
FIGS. 4A-4E show a side view of an example self-installing platform during the installation process.

FIG. 3 shows a flowchart with an example method 300 that can be utilized to deploy the self-installing platform 100. At 302, the undeployed self-installing platform 100 is positioned in a vertical orientation for towing. At 304, the undeployed self-installing platform 100 is towed in the vertical orientation to a destination. FIG. 4A shows the undeployed self-installing platform 100 after it has been towed to the desired location. At 306, the self-installing platform 100 is deployed.

Figure 4B:
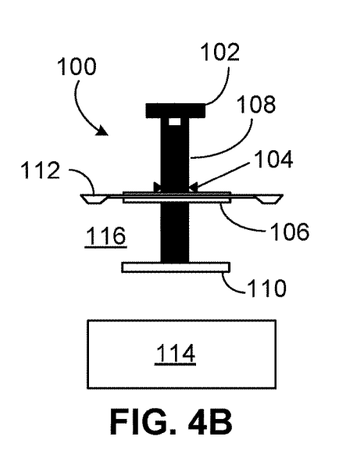
Figure 4C:
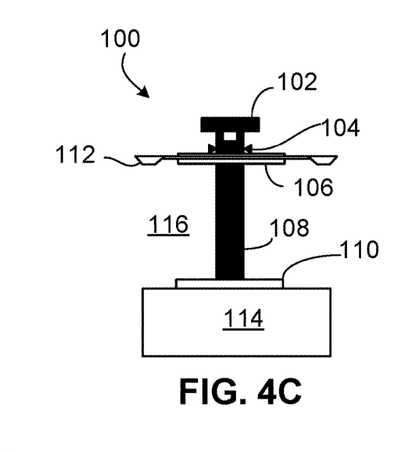

At 308, the top deck 102, the column 108, and the skirt 110 are all lowered towards the floor 114 of the body of water 116 to deploy the self-installing offshore platform. In some implementations, at 310, the rate at which the top deck 102, the column 108, and the skirt 110 are all lowered is controlled by the rollers 104 to deploy the self-installing offshore platform [As previously stated, the rollers 104 can control the decent through a friction braking system controlled by an operator. FIG. 4B shows the top deck 102, the column 108, and the skirt 110 lowering towards the floor 114 of the body of water 116. As stated previously, the rate and direction of descent is controlled by rollers 104, which is attached to the float 106. During the lowering operation, the float 106 is vertically stationary at the surface 112 of the water body 116. The top deck 102, the column 108, and the skirt 110 continue their descent until the skirt 110 contacts the floor 114 of the body of water 116 as shown in FIG. 4C.

Figure 4D:
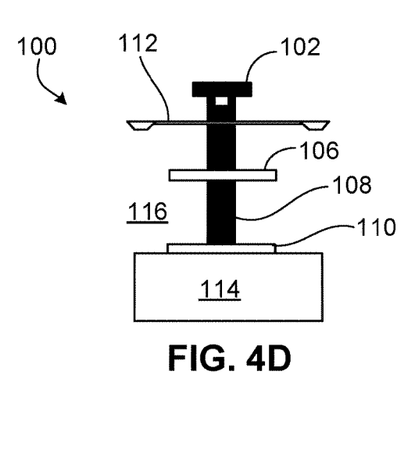
Figure 4E:
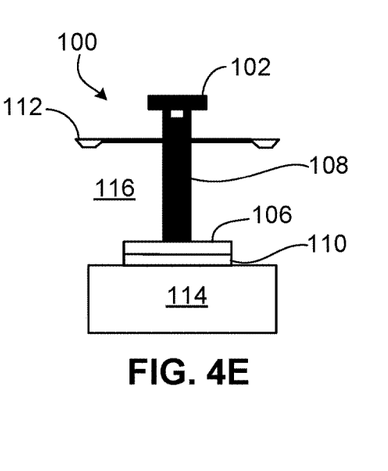

After the self-installing platform 100 has contacted the floor 114 of the water body 116, the rollers 104 is removed from self-installing platform 100. Referring back to FIG. 3, at 312, the ballastable float 106 is ballasted to sink towards the skirt 110 in response to the self-installing offshore platform being deployed on the floor 114 of the water body 116. If the ballastable float 106 is allowed to sit at or near the water surface 112, it can be subjected to large wave loads that can then induce high stresses in the structure. In the floating position, it can also reduce stability by increasing the vertical center of gravity of the system. Ballasting can be done by filling the float 106 with a substance, such as seawater, to reduce the buoyancy of the float 106 until the float 106 sinks towards the floor 114 of the water body 116. Sinking the float 106 can be seen in FIG. 4D. In FIG. 4D, the float 106 is moving from the surface 112 of the water body 116 towards the skirt 110. FIG. 4E shows the self-installing platform 100 in its deployed state. In the deployed state, the skirt 110 rests on the floor 114 of the water body 116 while the float 106 rests atop of the skirt 110. The self-installing platform 100 can be designed survive the extreme storm specified during design in the deployed state.

Figure 5:
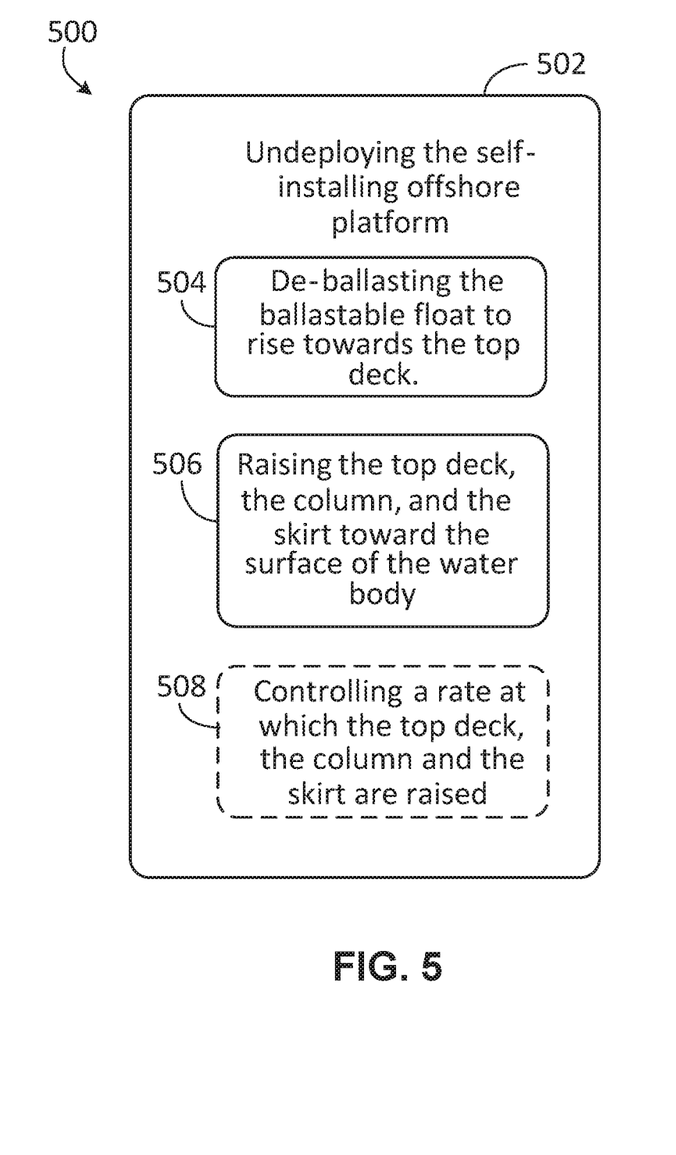
FIG. 5 shows a flowchart of an example method to recover a self-installing platform.

In some implementations, the self-installing platform 100 is reusable. FIG. 5 shows a flow chart with an example method 500 that can be utilized to recover the self-installing platform 100 after the self-installing platform 100 has been deployed, that is, method 500 brings the self-installing platform to a undeployed state. At 502, the self-installing platform 100 is undeployed. The undeployment sequence includes several steps beginning at 504, where the float 106 is de-ballasted, for example, by filling the float 106 with air, and floated towards the top deck 102. After the float 106 is floating on the surface 112 of the water body 116, the rollers 104 is installed. At 506, the top deck 102, the column 108, and the skirt 110 are raised towards the surface of the body of water by the rollers 104. The raising of the top deck 102, the column 108, and the skirt 110 can be accomplished by deballasting the skirt 110 and column 108. While the top deck 102, the column 108, and the skirt 110 are raised towards the surface of the body of water, at 508, the rate at which the top deck, the column, and the skirt are raised can be controlled by the rollers 104. Once the self-installing platform 100 is in the recovered state, the self-installing platform 100 can be towed to a new location or to a facility where the self-installing platform 100 can be overhauled.

Figure 6:
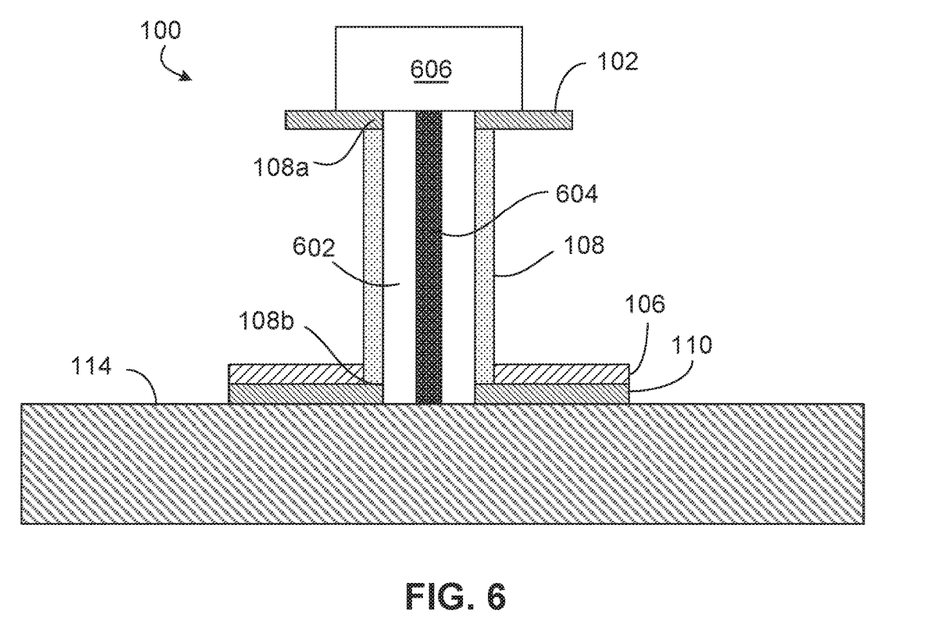
FIG. 6 is an example of a self-installing platform.

In some implementations, such as the implementation shown in FIG. 6, the self-installing platform 100 can be configured to support dry trees or a drilling/workover rig. In this case the column 108 will contain an annular moonpool 602 through which a vertical top-tensioned riser 604 pass between the deck 102 and the floor 114 of the waterbody 116 to a topside facility 606. In this implementation the column 108 float 106 and skirt 110 will all have larger dimensions due to the increased topsides payload associated with the drilling/workover rig and the loss of buoyancy of the system due to the moonpool 602.

Thus, particular implementations of the subject matter have been described. Other implementations are within the scope of the following claims.

The invention claimed is:

1. A method comprising:
in a vertically-oriented self-installing offshore platform comprising:
a top deck,
a column connected to the top deck,
a skirt connected to the column,
a ballastable float positioned between the top deck and the skirt, the ballastable float comprising an annular opening; and
guiding rollers connecting the column and the ballastable float, wherein the rollers are configured to controllably move the column through an opening in the ballastable float
transporting the self-installing offshore platform with a draft of twenty six feet;
deploying the self-installing offshore platform in a vertical orientation toward a floor of a water body that is three hundred feet from a surface of the water body;
in response to the self-installing offshore platform being deployed on the floor of the water body, ballasting the ballastable float to sink towards the skirt; and
in response to the ballastable float sinking, removing the guiding rollers from the self-installing offshore platform.

2. The method of claim 1, wherein deploying the self-installing offshore platform comprises lowering the top deck, the column and the skirt toward the floor of the water body, wherein the column passes through the annular opening.

3. The method of claim 2, further comprising controlling a rate at which the top deck, the column and the skirt are lowered toward the floor of the water body.

4. The method of claim 2, wherein the skirt contacts the floor of the water body when the self-installing offshore platform is deployed.

5. The method of claim 1, further comprising towing the self-installing offshore platform in the vertical orientation to a destination in the water body with a topside facility pre-installed on the top-deck of the platform.

6. The method of claim 5, further comprising positioning the self-installing offshore platform in the vertical orientation before towing the self-installing offshore platform to the destination.

7. The method of claim 1 further comprising undeploying the self-installing offshore platform in a vertical orientation away from the floor of the water body towards the surface of the water body to an undeployed state.

8. The method of claim 7 further comprising de-ballasting the ballastable float to rise towards the top deck.

9. The method of claim 8 wherein the undeploying of the self-installing offshore platform comprises raising the top deck, the column and the skirt toward the surface of the water body.

10. The method of claim 9 further comprising controlling a rate at which the top deck, the column and the skirt are raised away from the floor of the water body.

11. The method of claim 7 wherein the undeployed state comprises the self-installing platform floating on the surface the body of water.

12. A method comprising:
in a vertically-oriented self-installing offshore platform comprising:
a top deck,
a column connected to the top deck,
a skirt connected to the column,
a ballastable float positioned between the top deck and the skirt, the ballastable float completely surrounding the column; and
guiding rollers connecting the column and the ballastable float, wherein the rollers are configured to controllably move the column through an opening in the ballastable float, wherein the platform has a draft of twenty two feet in an undeployed state;

lowering the top deck, column, and skirt in a vertical orientation toward a floor of a water body from a surface of the water body to a depth of three hundred feet;

in response to the self-installing offshore platform being lowered on the floor of the water body, ballasting the ballastable float to sink towards the skirt; and in response to the ballastable float sinking, removing the guiding rollers from the self-installing offshore platform.

13. The system of claim 12, wherein the ballastable float comprises multiple ballastable segments, each of the ballastable segments attached to one another, each of the ballastable sections being adjacent to a side of the column.

\* \* \* \* \*

UNITED STATES PATENT AND TRADEMARK OFFICE
CERTIFICATE OF CORRECTION

PATENT NO. : 10,352,010 B2  
APPLICATION NO. : 15/431058  
DATED : July 16, 2019  
INVENTOR(S) : Rabih A. Khodr Page 1 of 1

It is certified that error appears in the above-identified patent and that said Letters Patent is hereby corrected as shown below:

In the Claims

Column 8, Line 40, Claim 7, delete "Claim 1" and insert -- Claim 1, --;

Column 8, Line 44, Claim 8, delete "Claim 7" and insert -- Claim 7, --;

Column 8, Line 46, Claim 9, delete "Claim 8" and insert -- Claim 8, --;

Column 8, Line 50, Claim 10, delete "Claim 9" and insert -- Claim 9, --;

Column 8, Line 53, Claim 11, delete "Claim 7" and insert -- Claim 7, --;

Column 9, Line 13, Claim 13, delete "system" and insert -- method --.

Signed and Sealed this  
Twenty-sixth Day of November, 2019

Andrei Iancu  
*Director of the United States Patent and Trademark Office*